US012675181B2

(12) United States Patent
Hung et al.

(10) Patent No.: US 12,675,181 B2
(45) Date of Patent: Jul. 7, 2026

(54) TOUCH ASSEMBLY AND METHOD OF MANUFACTURING THE SAME

(71) Applicant: TPK Glass Solutions (Xiamen) Inc., Xiamen (CN)

(72) Inventors: Jie Lin Hung, Kaohsiung City (TW); Li Huang Tsai, Miaoli County (TW); Lien Hsin Lee, Xiamen City (CN); Liang Liu, Xiamen City (CN); Cheng Chie Li, New Taipei City (TW); Chun Ping Zhou, Guang'an City (CN)

(73) Assignee: TPK Glass Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 19/098,119

(22) Filed: Apr. 2, 2025

(65) Prior Publication Data

US 2025/0321655 A1     Oct. 16, 2025

(30) Foreign Application Priority Data

Apr. 10, 2024     (CN) .......................... 202410430756.3

(51) Int. Cl.
*G06F 3/041*          (2006.01)

(52) U.S. Cl.
CPC .... *G06F 3/041* (2013.01); *G06F 2203/04103* (2013.01)

(58) Field of Classification Search
CPC ....................................................... G06F 3/041
See application file for complete search history.

(56) References Cited

U.S. PATENT DOCUMENTS

| | | | |
|---|---|---|---|
| 9,281,815 B2 * | 3/2016 | Wang | G06F 3/0446 |
| 10,564,743 B2 * | 2/2020 | Kang | G06F 3/041 |
| 10,754,488 B2 * | 8/2020 | Nakayama | G06F 3/047 |
| 11,106,244 B2 * | 8/2021 | Li | G06F 1/1643 |
| 11,262,879 B1 * | 3/2022 | Chen | G06F 3/0443 |
| 11,301,095 B2 * | 4/2022 | Zhu | G06F 3/04164 |
| 12,386,471 B2 * | 8/2025 | Kim | G06F 3/0416 |
| 2019/0204948 A1 * | 7/2019 | Xie | G02F 1/13306 |
| 2021/0011567 A1 * | 1/2021 | Fang | G06F 3/0446 |
| 2024/0172381 A1 * | 5/2024 | Kim | C09D 175/16 |
| 2024/0263042 A1 * | 8/2024 | Luo | B32B 37/1284 |

FOREIGN PATENT DOCUMENTS

| | | |
|---|---|---|
| CN | 203930738 U | 11/2014 |
| CN | 105425992 A | 3/2016 |
| CN | 106325581 A | 1/2017 |
| TW | 201616309 A | 5/2016 |
| TW | 202206990 A | 2/2022 |

* cited by examiner

*Primary Examiner* — Chun-Nan Lin
(74) *Attorney, Agent, or Firm* — COOPER LEGAL GROUP LLC

(57) ABSTRACT

A touch assembly includes a protective cover, a first adhesive layer, a plurality of curved wires, and a second adhesive layer. The first adhesive layer is disposed on the protective cover. A thickness of the first adhesive layer ranges from 20 $\mu$m to 200 $\mu$m. An initial tack of the first adhesive layer ranges from 1800 gf/in to 4000 gf/in. The curved wires are disposed on the first adhesive layer and include a first group of wires and a second group of wires. The first group of wires extend along a first direction. The second group of wires extend along a second direction and overlap the first group of wires. Each of the curved wires includes a conductive inner core and a covering layer. The second adhesive layer covers the curved wires and the first adhesive layer.

19 Claims, 10 Drawing Sheets

100

140

130

150

120

110

Disposing a plurality of curved wires on the first adhesive layer — S210

Putting the second adhesive layer over the curved wires and the first adhesive layer — S220

Welding the circuit board to the curved wires — S230

Placing the assembly of the first adhesive layer, the curved wires, the second adhesive layer, and the circuit board on the protective cover plate. — S240

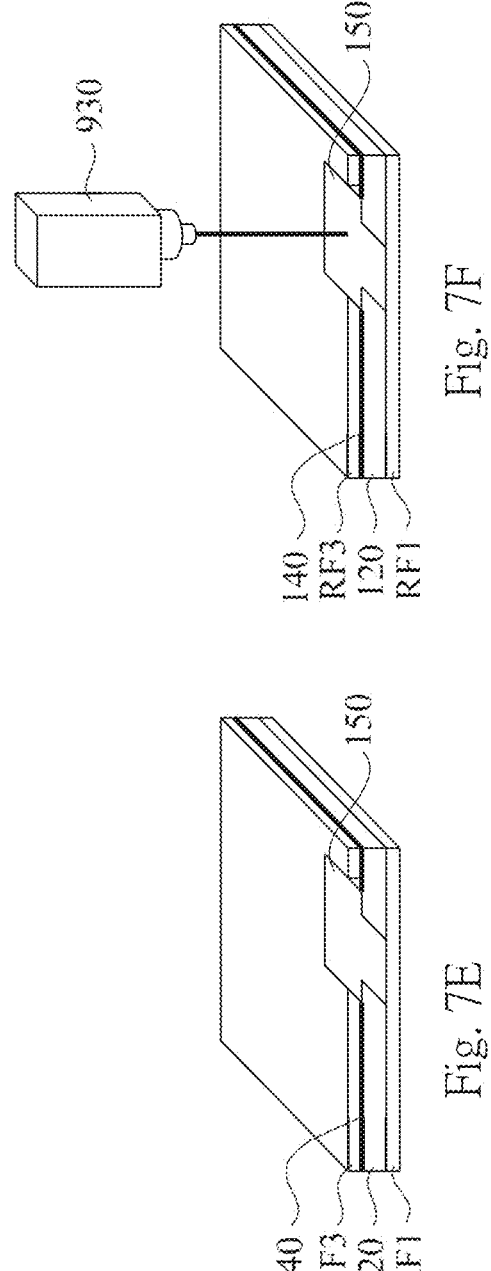
Fig. 7E
Fig. 7F
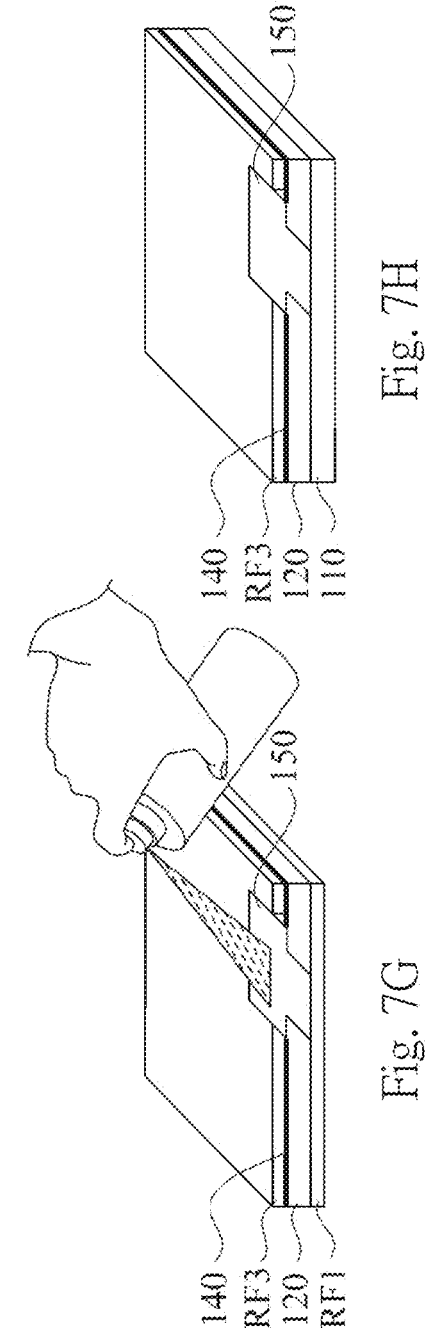
Fig. 7G
Fig. 7H

TOUCH ASSEMBLY AND METHOD OF MANUFACTURING THE SAME

CROSS-REFERENCE TO RELATED APPLICATION

The instant application claims priority to China Patent Application 202410430756.3, filed on Apr. 10, 2024, which is incorporated herein by reference.

BACKGROUND

Field of Disclosure

The present disclosure relates to a touch assembly and the manufacturing method thereof.

Description of Related Art

As diversified developments of touch modules progress, touch modules have been maturely implemented in industrial electronic and consumer products. It gradually becomes more and more common to have various touch products embedded in medium and large-scale products.

However, the manufacturing process of the touch modules of the prior art uses indium tin oxide (ITO) as transparent electrodes. To produce ITO, rare metal indium is required. The reserves of indium are limited and the mining process thereof creates environmental pollution, and vast amount of ITO is wasted during the manufacturing process of the prior art. The waste needs to be handled properly to prevent environment pollution. In addition, the aforementioned prior art requires high temperature, high pressure, vacuum deposition equipment that consumes high energy.

Therefore, to introduce a touch assembly and the manufacturing method thereof that can solve the aforementioned problems is what the industry invests its research and development resources in and intends to achieve.

SUMMARY

In view of the foregoing statement, the objective of the present disclosure is to provide a touch assembly and the manufacturing method thereof that can solve the aforementioned problems.

To achieve the aforementioned objective, according to one of the embodiments of the present disclosure, a touch assembly comprises a protective cover plate, a first adhesive layer, a plurality of curved wires, and a second adhesive layer. The first adhesive layer is disposed on the protective cover plate, and a thickness of the first adhesive layer is from 20 μm to 200 μm. An initial tack of the first adhesive layer is from 1800 gf/in to 4000 gf/in. The plurality of curved wires are disposed on the first adhesive layer and comprise a first group of wires and a second group of wires. The first group of wires extends along a first direction. The second group of wires extends along a second direction and is spliced with the first group of wires. Each of the plurality of curved wires comprises a conductive inner core and a covering layer. The second adhesive layer covers the plurality of curved wires and the first adhesive layer.

In one or several embodiments of the present disclosure, each of the plurality of curved wires is an enameled wire.

In one or several embodiments of the present disclosure, a material of the covering layer is selected from a group consisting of polyvinyl formal, polyurethane (PU), polyamide (PA), polyester, polyester-polyimide (PI), polyamide-polyimide, polyimide, and a combination thereof.

In one or several embodiments of the present disclosure, a wire diameter of the conductive inner core is from 2 μm to 5 μm.

In one or several embodiments of the present disclosure, a thickness of the covering layer is from 1 μm to 3 μm.

In one or several embodiments of the present disclosure, a thickness of the second adhesive layer is from 25 μm to 150 μm.

In one or several embodiments of the present disclosure, the first adhesive layer and the second adhesive layer fill gaps within the first group of wires and gaps within the second group of wires.

To achieve the aforementioned objective, according to one embodiment of the present disclosure, a manufacturing method of a touch assembly comprises: disposing a plurality of curved wires on a first adhesive layer, wherein the plurality of curved wires comprise a first group of wires and a second group of wires, the first group of wires extends along a first direction, the second group of wires extends along a second direction and is spliced with the first group of wires, and each of the plurality of curved wires comprises a conductive inner core and a covering layer; putting a second adhesive layer over the plurality of curved wires and the first adhesive layer; and laminating the first adhesive layer on a protective cover plate.

In one or several embodiments of the present disclosure, laminating the first adhesive layer on the protective cover plate comprises: placing an assembly of the first adhesive layer, the plurality of curved wires, and the second adhesive layer over the protective cover plate.

In one or several embodiments of the present disclosure, disposing the plurality of curved wires on the first adhesive layer comprises: winding enameled wire on to the first adhesive layer; and cutting the enameled wire to form the plurality of curved wires.

In one or several embodiments of the present disclosure, disposing the plurality of curved wires on the first adhesive layer further comprises: disposing pre-embedded wire on the first adhesive layer before winding the enameled wire on to the first adhesive layer, wherein winding the enameled wire on to the first adhesive layer is configured to let the enameled wire partially cover over the pre-embedded wire. Cutting the enameled wire to form the plurality of curved wires comprises: peeling the pre-embedded wire from the first adhesive layer, causing the enameled wire to break and form the plurality of curved wires.

In one or several embodiments of the present disclosure, a wire diameter of the pre-embedded wire is larger than a wire diameter of the enameled wire.

In one or several embodiments of the present disclosure, putting the second adhesive layer over the plurality of curved wires and the first adhesive layer comprises: coating hydrogel on the first adhesive layer to cover the plurality of curved wires; and hardening the hydrogel to form the second adhesive layer.

In one or several embodiments of the present disclosure, putting the second adhesive layer over the plurality of curved wires and the first adhesive layer further comprises: placing a plate over the hydrogel; and rolling a roller over the plate.)

In one or several embodiments of the present disclosure, cutting the enameled wire to form the plurality of curved wires is carried out through a laser cutting process.

In one or several embodiments of the present disclosure, the manufacturing method of touch assemblies further comprises: putting the second adhesive layer over the enameled wire and the first adhesive layer before cutting the enameled wire to the plurality of form curved wires, wherein cutting the enameled wire to form the plurality of curved wires also simultaneously cuts the second adhesive layer.

In one or several embodiments of the present disclosure, laminating the first adhesive layer on the protective cover plate is performed before disposing the plurality of curved wires on the first adhesive layer.

In one or several embodiments of the present disclosure, a thickness of the first adhesive layer is from 20 μm to 200 μm. An initial tack of the first adhesive layer is from 1800 gf/in to 4000 gf/in.

In one or several embodiments of the present disclosure, putting the second adhesive layer over the plurality of curved wires and the first adhesive layer is to let the first adhesive layer and the second adhesive layer fill gaps within the first group of wires and gaps within the second group of wires.

In one or several embodiments of the present disclosure, the manufacturing method of touch assemblies further comprises: welding circuit boards to the plurality of curved wires.

In summary, for the touch assembly of the present disclosure, due to the fact that each curved wire is a wire having a conductive inner core and a covering layer, winding technology is used during the touch assembly production so that problems of high pollution and high energy consumption that occur during the complex production process of the prior art that uses indium tin oxide (ITO) as transparent electrodes can be prevented. By limiting the thickness of the first adhesive layer and the initial tack thereof within a specific range, the problem of a jump wire that occurs between the curved wires and the corresponding first adhesive layer during the winding process can be effectively prevented. In the manufacturing method of touch assemblies of the present disclosure, by placing the assembly of the first adhesive layer, the curved wires, and the second adhesive layer on the protective cover plate after the step of laminating the second adhesive layer, the problem of damaging the black matrix layer on the protective cover plate caused by the high temperature during the laminating process can be effectively prevented. Furthermore, gaps among the curved wires can be filled by the first adhesive layer and the second adhesive layer through the method of laminating curved wires between the first adhesive layer and the second adhesive layer. As a result, the visual sense of seeing the curved wires from one side of the second adhesive layer is reduced effectively (that is, reducing the generation of shadows).

The aforementioned statements are used for explaining the problems that can be solved by the present disclosure, the technical means for solving the problems, and the effect thereof. The present disclosure will become more fully understood from the detailed descriptions given herein below by way of embodiments with reference to the accompanying drawings for illustration only.

BRIEF DESCRIPTION OF THE DRAWINGS

To better understand the aforementioned and other objectives, novel features, advantages, embodiments, and the effect of the present disclosure, diagrams are provided as follows.

FIG. 7A to FIG. 7H are schematic diagrams of, respectively, intermediate steps of a manufacturing method of the touch assembly of an embodiment of the present disclosure.

DETAILED DESCRIPTION

Figure 1:
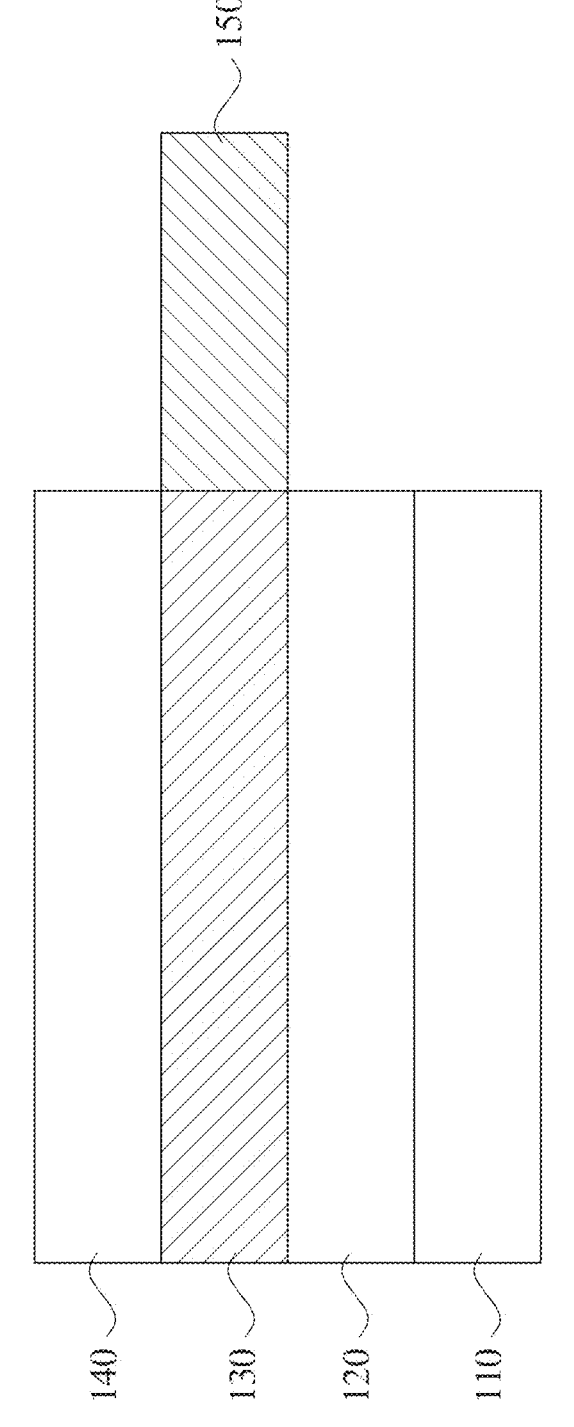
FIG. 1 is a schematic diagram of an embodiment of the touch assembly of the present disclosure.

A plurality of embodiments of the present disclosure will be disclosed below with reference to drawings. For the purpose of clear illustration, many details in practice will be provided together with the following descriptions. However, these detailed descriptions in practice are for illustration only and shall not be interpreted to limit the scope, applicability, or configuration of the present disclosure in any way. That is, in some embodiments of the present disclosure, these details in practice are not required. Furthermore, for the purpose of simplifying drawings, some structures and components of the prior art shown in the drawings will be illustrated schematically.

Figure 2:
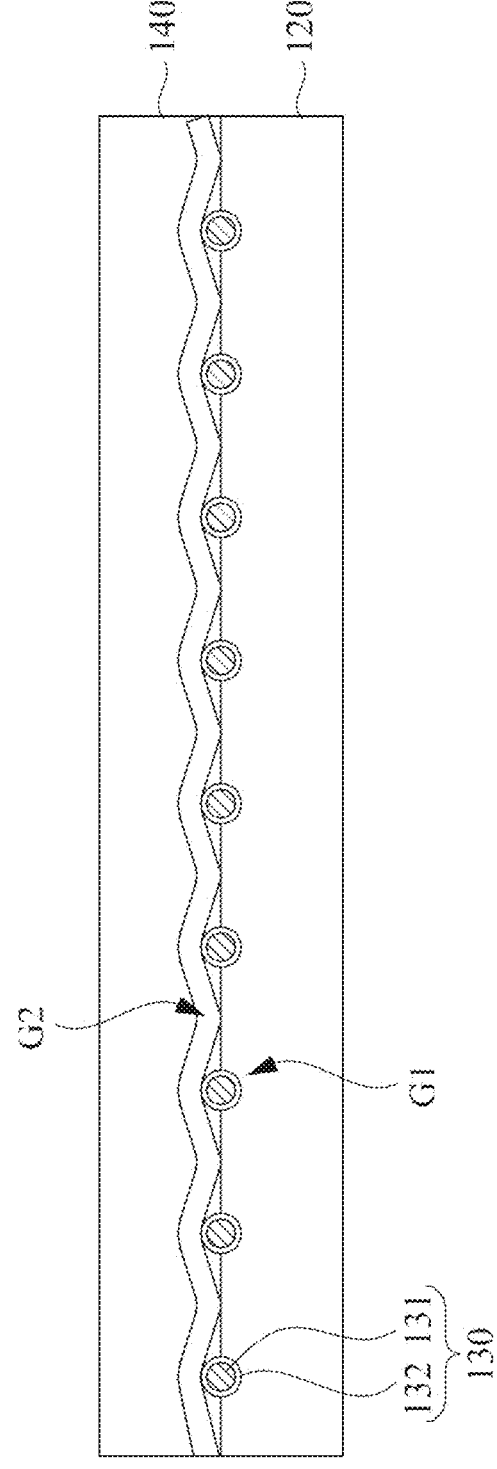
FIG. 2 is a partial cross-section schematic diagram of some elements of FIG. 1.

Please refer to FIG. 1 and FIG. 2. FIG. 1 is a schematic diagram of an embodiment of a touch assembly 100 of the present disclosure. FIG. 2 is a partial cross-section schematic diagram of some elements of FIG. 1. In the embodiment, as illustrated in FIG. 1 and FIG. 2, a touch assembly 100 comprises a protective cover plate 110, a first adhesive layer 120, a plurality of curved wires 130, a second adhesive layer 140, and a circuit board 150. The first adhesive layer 120 is disposed on the protective cover plate 110. The curved wire 130 is disposed on the first adhesive layer 120 and comprises a first group of wires G1 and a second group of wires G2. The first group of wires G1 extends along a first direction, and the wires of the first group of wires G1 are disposed apart from each other. The second group of wires G2 extends along a second direction and is spliced with the first group of wires G1, and the wires of the second group of wires G2 are disposed apart from each other. In some embodiments, the first direction and the second direction are perpendicular to each other, for example, directions of an X-axis and a Y-axis. The second adhesive layer 140 covers the curved wires 130 and the first adhesive layer 120. The circuit board 150 and the curved wires 130 are electrically connected. The circuit board 150 is, for example, a flexible printed circuit board. However, the present disclosure is not limited thereto.

More specifically, as shown in FIG. 2, each curved wire comprises a conductive inner core 131 and a covering layer 132. The covering layer 132 is composed of insulation materials. Therefore, the conductive inner cores 131 of the first group of wires G1 and the second group of wires G2 are electrically insulated respectively through the covering layers 132 of the first group of wires G1 and the second group of wires G2 respectively. Hereby, touch signals (for example, mutual capacitive sensing signals) between the first group of wires G1 and the second group of wires G2 can be drawn to the circuit board 150.

In the embodiment, every curved wire 130 is an enameled wire. Therefore, the curved wires 130 can be produced by winding technology in the touch assembly 100 so as to prevent the problems of high pollution and high energy consumption that occur during the complex production process of the prior art, which uses indium tin oxide (ITO) as transparent electrodes.

During practical implementation, the curved wires 130 also can be a combination of enameled wire and transparent electrodes of indium tin oxide (ITO). For example, one group in the first group of wires G1 and the second group of wires G2 of the curved wires 130 consists of enameled wire while the other group in the first group of wires G1 and the second group of wires G2 consists of transparent electrodes of indium tin oxide.

In several embodiments, the material of the conductive inner core 131 of the curved wire 130 comprises silver, copper, aluminum, tungsten, or similar metals.

In several embodiments, the material of the conductive inner core 131 of the curved wire 130 comprises palladium copper alloy, silver copper palladium alloy, molybdenum rhenium alloy, aluminum alloy, nickel alloy, or similar alloys.

In the embodiment, the thickness of the first adhesive layer 120 is from 20 μm to 200 μm. The initial tack of the first adhesive layer 120 is from 1800 gf/in to 4000 gf/in. One thing to be noted is that when the hardness of the curved wire 130 is high (for example, the material of the conductive inner core 131 of the curved wire 130 is an alloy), the curved wire 130 wound on the first adhesive layer 120 can easily generate ridding stress, resulting in a jump wire problem.

In several embodiments, the material of the covering layer 132 of the curved wire 130 is composed of polyvinyl formal, polyurethane, polyamide, polyester, polyester-polyimide, polyamide-polyimide, or polyimide. However, the present disclosure is not limited thereto.

In several embodiments, the wire diameter of the conductive inner core 131 of the curved wire 130 is from 2 μm to 20 μm. Preferably, the wire diameter of the conductive inner core 131 is from 2 μm to 5 μm in order to increase the visibility of the touch assembly 100, in other words, reduce the visual sense of the curved wire 130. In several embodiments, the thickness of the covering layer 132 of the curved wire 130 is from 1 μm to 3 μm. For example, in one embodiment, the wire diameter of the conductive inner core 131 is around 5 μm, whereas the thickness of the covering layer 132 is around 2 μm (such that the wire diameter of the curved wire is around 7 μm). However, the present disclosure is not limited thereto.

In the embodiment, as shown in FIG. 2, the first adhesive layer 120 and the second adhesive layer 140 fill the gaps within the first group of wires G1 and the gaps within the second group of wires G2. Therefore, gaps between the curved wires 130 and the first adhesive layer 120 and the second adhesive layer 140 caused by indentation can be eliminated. As a result, the visual sense of seeing the curved wires 130 from one side of the second adhesive layer 140 can be reduced effectively (that is, reducing the generation of shadows).

In several embodiments, at least one of the first adhesive layer 120 or the second adhesive layer 140 is an optical clear adhesive (OCA) layer or a liquid optical clear adhesive layer. However, the present disclosure is not limited thereto.

In several embodiments, the thickness of the second adhesive layer 140 is from 25 μm to 150 μm. When the thickness of the second adhesive layer 140 is smaller than the aforementioned lower limit, the aforementioned gaps will not be easily removed. When the thickness of the second adhesive layer 140 is larger than the aforementioned upper limit, it will lead to an increase of the overall volume, weight, and cost of the touch assembly 100.

Figure 3:
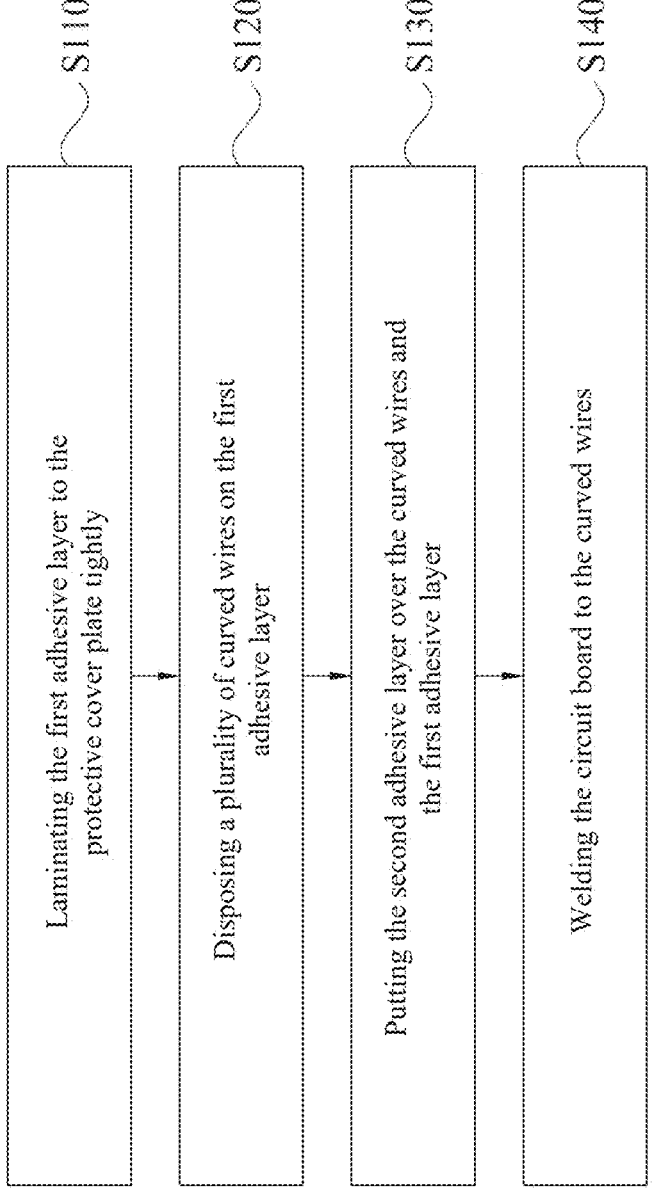
FIG. 3 is a flowchart of a manufacturing method of the touch assembly of an embodiment of the present disclosure.

Please refer to FIG. 3, which is a flowchart of a manufacturing method of the touch assembly of an embodiment of the present disclosure. In the embodiment, as shown in FIG. 3 in conjunction with FIG. 1 and FIG. 2, the manufacturing method of the touch assembly comprises Step S110 to Step S140.

Step S110: Laminate the first adhesive layer 120 to the protective cover plate 110 tightly.

In several embodiments, Step S110 continuously laminates the first adhesive layer 120 onto the protective cover plate 110 at about 130 degrees Celsius for a period of about 40 minutes. However, the present disclosure is not limited thereto.

In several embodiments, prior to Step S110, a process to form a black matrix (BM) layer on the protective cover plate 110 is carried out. After Step S110 is implemented, the first adhesive layer 120 will be in contact with the black matrix layer.

Step S120: Dispose a plurality of curved wires 130 on the first adhesive layer 120.

In several embodiments, Step S120 comprises: winding enameled wire 130A (in reference to FIG. 5C and FIG. 7B) on to the first adhesive layer 120; and cutting enameled wire 130A to form curved wires 130.

In several embodiments, the step of cutting enameled wire 130A to form curved wires 130 is carried out through a laser cutting process. However, the present disclosure is not limited thereto.

Step S130: Put the second adhesive layer 140 over the curved wires 130 and the first adhesive layer 120.)

In several embodiments, Step S130 continuously laminates the second adhesive layer 140 onto the first adhesive layer 120 at about 130 degrees Celsius for a period of about 40 minutes. However, the present disclosure is not limited thereto.

Step S140: Weld the circuit boards 150 to the curved wires 130.

In several embodiments, Step S140 is carried out through a laser welding process. However, the present disclosure is not limited thereto.

Figure 4:
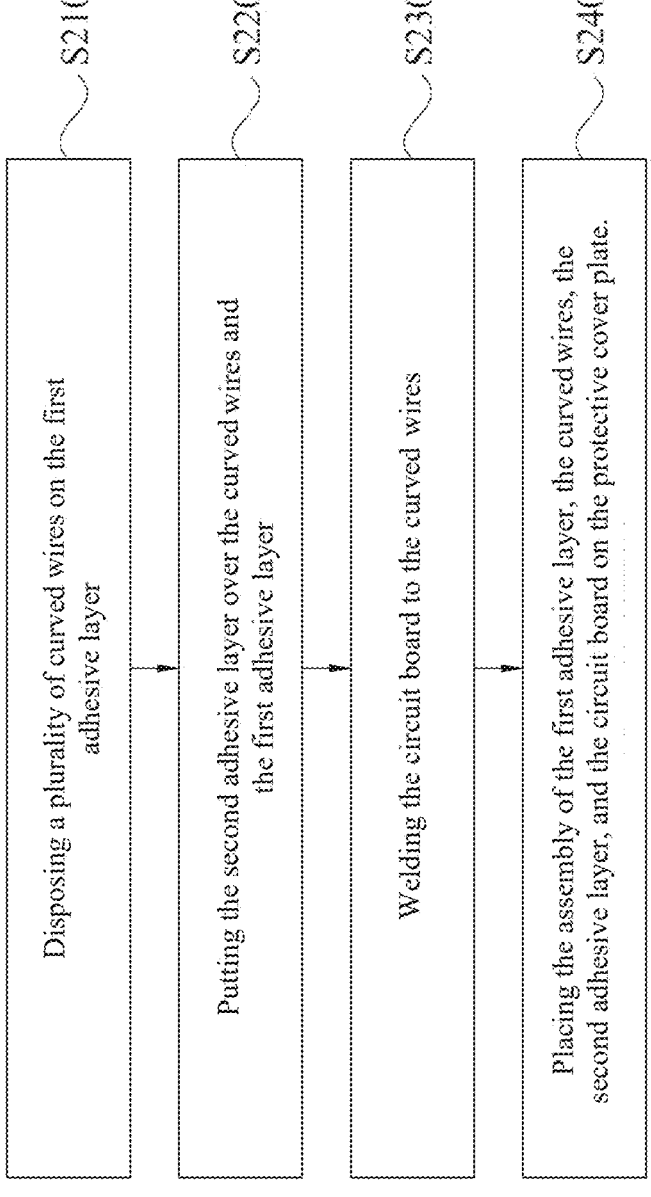
FIG. 4 is a flowchart of a manufacturing method of the touch assembly of another embodiment of the present disclosure.

Please refer to FIG. 4. FIG. 4 is a flowchart of a manufacturing method of the touch assembly of another embodiment of the present disclosure. In the embodiment, as shown in FIG. 4 in conjunction with FIG. 1 and FIG. 2, the manufacturing method of the touch assembly comprises Step S210 to Step S240.

Step S210: Dispose a plurality of curved wires 130 on the first adhesive layer 120.

In several embodiments, Step S210 comprises: winding enameled wire 130A (in reference to FIG. 5C and FIG. 7B) on to the first adhesive layer 120; and cutting enameled wire 130A to form curved wires 130.

Step S220: Put the second adhesive layer 140 over the curved wires 130 and the first adhesive layer 120.

In several embodiments, Step S220 continuously laminates the second adhesive layer 140 onto the first adhesive layer 120 at about 130 degrees Celsius for a period of about 40 minutes. However, the present disclosure is not limited thereto.

Step S230: Weld the circuit board 150 to the curved wires 130.

In several embodiments, Step S230 is carried out through a laser welding process. However, the present disclosure is not limited thereto.

Step S240: Place the assembly of the first adhesive layer 120, the curved wires 130, and the second adhesive layer 140, and the circuit board on the protective cover plate 110.

In comparison to the embodiment shown in FIG. 3, the embodiment illustrated in FIG. 4 places the assembly of the first adhesive layer 120, the curved wires 130, and the second adhesive layer 140 over the protective cover plate 110 after the laminating process of the second adhesive layer 140, so that the problem of damaging the black matrix layer on the protective cover plate 110 caused by the high temperature during the laminating process can be effectively prevented.

Please refer to FIG. 5A to FIG. 5J, which are schematic diagrams of, respectively, intermediate steps of the manufacturing method of the touch assembly of an embodiment of the present disclosure. The embodiment is one specific embodiment of the manufacturing method illustrated in FIG. 4, and descriptions are provided as follows.

Figure 5A:
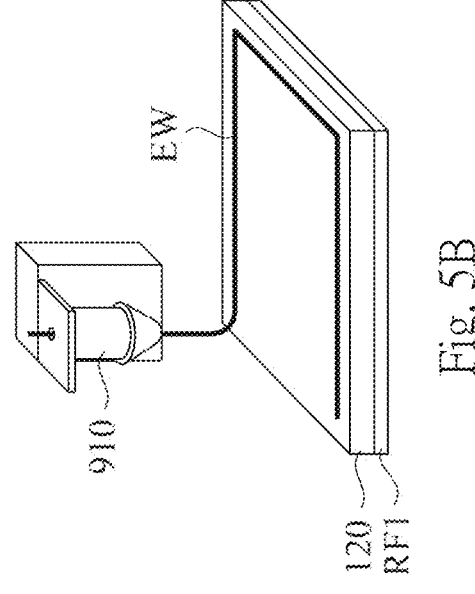
FIG. 5A to FIG. 5J are schematic diagrams of, respectively, intermediate steps of a manufacturing method of the touch assembly of an embodiment of the present disclosure.

In the step illustrated in FIG. 5A, both the surfaces of the first adhesive layer 120 opposite to each other are laminated with the separation films RF1, RF2 respectively.

Figure 5B:
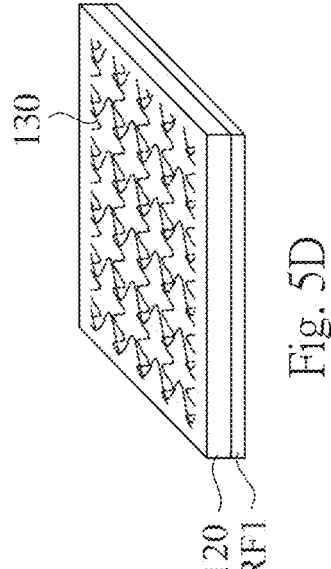

As shown in FIG. 5B, this step follows the step shown in FIG. 5A. In this step, the separation film RF2 is peeled off; then a pre-embedded wire EW is disposed on the surface of the first adhesive layer 120 that was originally laminated with the separation film RF2. The pre-embedded wire EW is wound on the first adhesive layer 120 by a winding machine 910. The pre-embedded wire EW has a U-shape after the winding process, as shown in FIG. 5B. However, the present disclosure is not limited thereto.

Figure 5C:
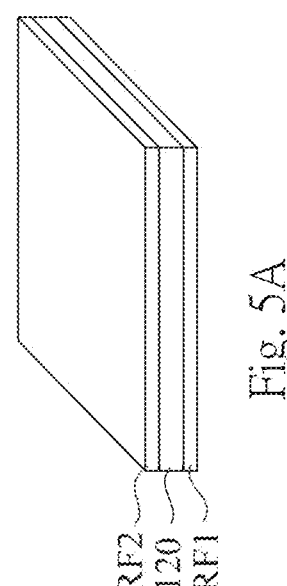

As shown in FIG. 5C, this step follows the step shown in FIG. 5B. In this step, the enameled wire 130A is wound on the first adhesive layer 120. The winding method is, for example, to wind the wire back and forth and around along a route on the first adhesive layer 120, so that the enameled wire 130A partially covers over the pre-embedded wire EW. Specifically, as shown in FIG. 5C, the enameled wire 130A is disposed on the first adhesive layer 120 in a checkerboard pattern, and three edges of the checkerboard pattern are spliced with the pre-embedded wire EW.

Figure 5D:
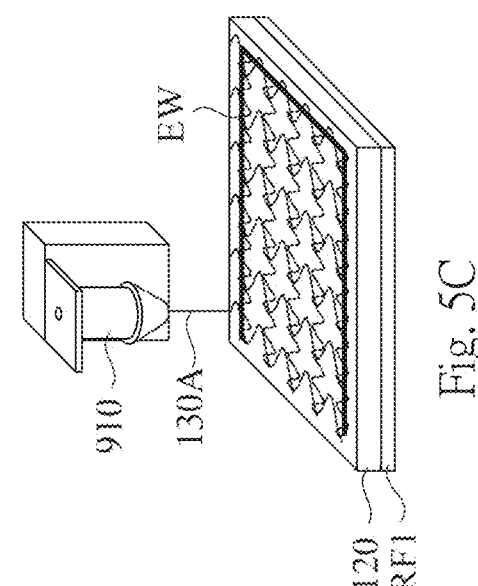

As shown in FIG. 5D, this step follows the step shown in FIG. 5C. In this step, a single enameled wire 130A is cut to form a plurality of curved wires 130. Specifically, this step can cause the enameled wire 130A to break up and form curved wires 130 through the action of peeling the pre-embedded wire EW from the first adhesive layer 120. The mechanism of peeling the pre-embedded wire EW to cause the enameled wire 130A to break up is similar to the action of pulling tear tape on cellophane of a cigarette pack. In comparison to a method that uses a cutlery to cut the enameled wire 130A, the present step will not leave tool marks on the first adhesive layer 120. Therefore, Step S210 can be carried by executing steps illustrated in FIG. 5B, FIG. 5C, and FIG. 5D in sequence.

In several embodiments, the wire diameter of the pre-embedded wire EW is larger than the wire diameter of the enameled wire 130A. Hereby, the larger pre-embedded wire EW has higher tensile strength than the thinner enameled wire 130A, so that during the process of peeling the pre-embedded wire EW that forces the enameled wire 130A to break up, the pre-embedded wire EW will not also break apart. In one embodiment, the wire diameter of the pre-embedded wire EW is around 20 μm, and the wire diameter of the enameled wire 130A is around 5 μm. However, the present disclosure is not limited thereto.

Figures 5E, 5F, 5G, 5H:
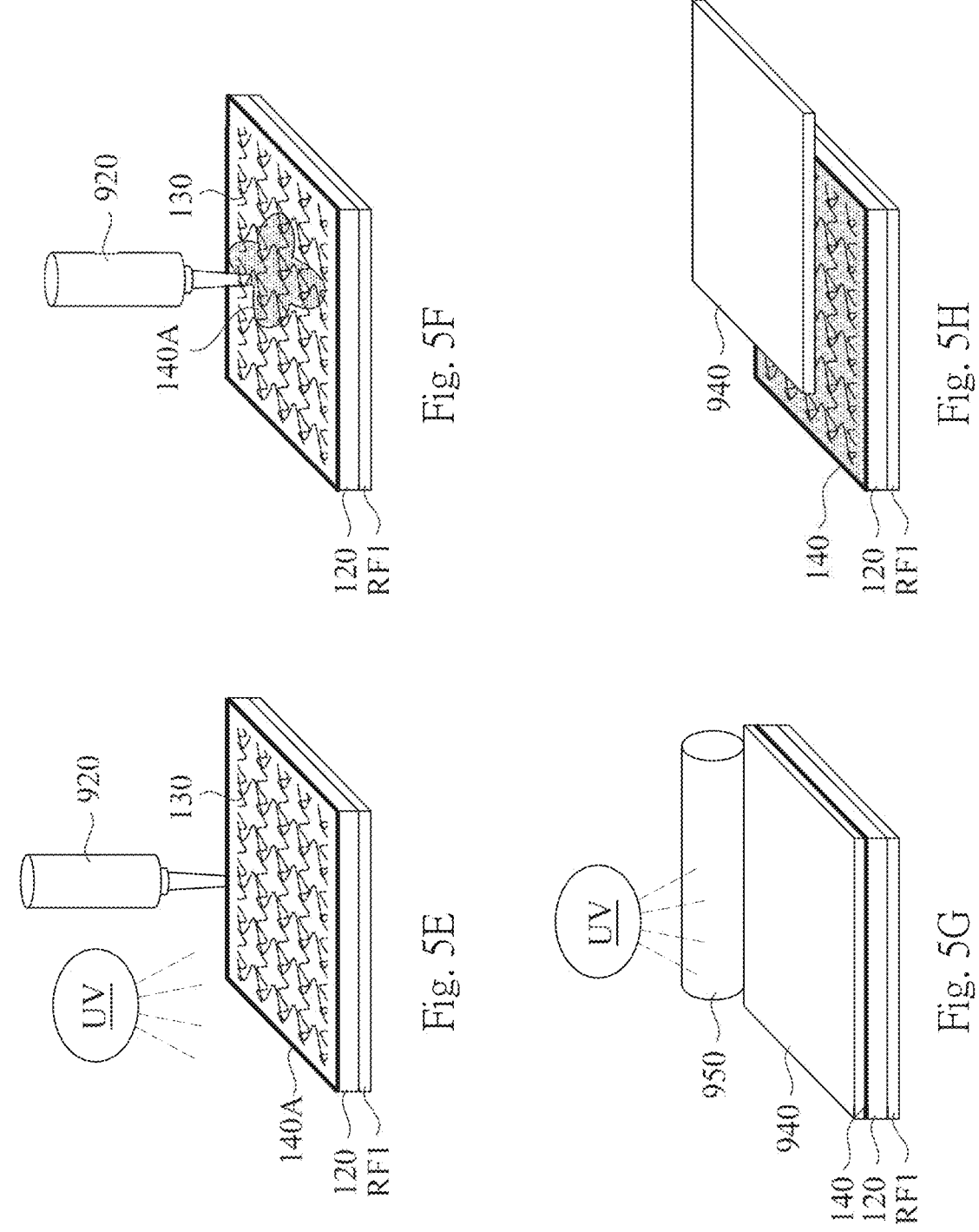

As shown in FIG. 5E, this step follows the step shown in FIG. 5D. In this step, hydrogel 140A is coated on the first adhesive layer 120 using a glue spreader 920. Specifically, the hydrogel 140A is coated on an outer edge of the first adhesive layer 120. In several embodiments, the hydrogel 140A is a type of light curing gel. For example, the light curing gel is hardened after being exposed to ultraviolet (UV) light. Hereby, when light exposure also occurs during this step, the hydrogel 140A coated on the outer edge of the first adhesive layer 120 is hardened and becomes an outer wall.

As shown in FIG. 5F, this step follows the step shown in FIG. 5E. In this step, the hydrogel 140A is further coated over the first adhesive layer 120 using a glue spreader 920 in order to cover the curved wires 130. In other words, the hydrogel 140A is coated over and fills in the space within the aforementioned outer wall in this step. In other embodiments, this step can also use methods of scrapping, dispensing, slitting, filling, or similar coating methods.

As shown in FIG. 5G, this step follows the step shown in FIG. 5F. In this step, the plate 940 is placed on and covers the hydrogel 140A, and the plate 940 is rolled using a roller 950. Hereby, when light exposure also occurs during this step, the hydrogel 140A is hardened into the second adhesive layer 140 of uniform thickness.

As shown in FIG. 5H, this step follows the step shown in FIG. 5G. In this step, after the hydrogel 140A is hardened into the second adhesive layer 140, the plate 940 can be removed. Therefore, step S220 can be carried by executing steps illustrated in FIG. 5E, FIG. 5F, FIG. 5G, and FIG. 5H in sequence.

Figures 5I, 5J:
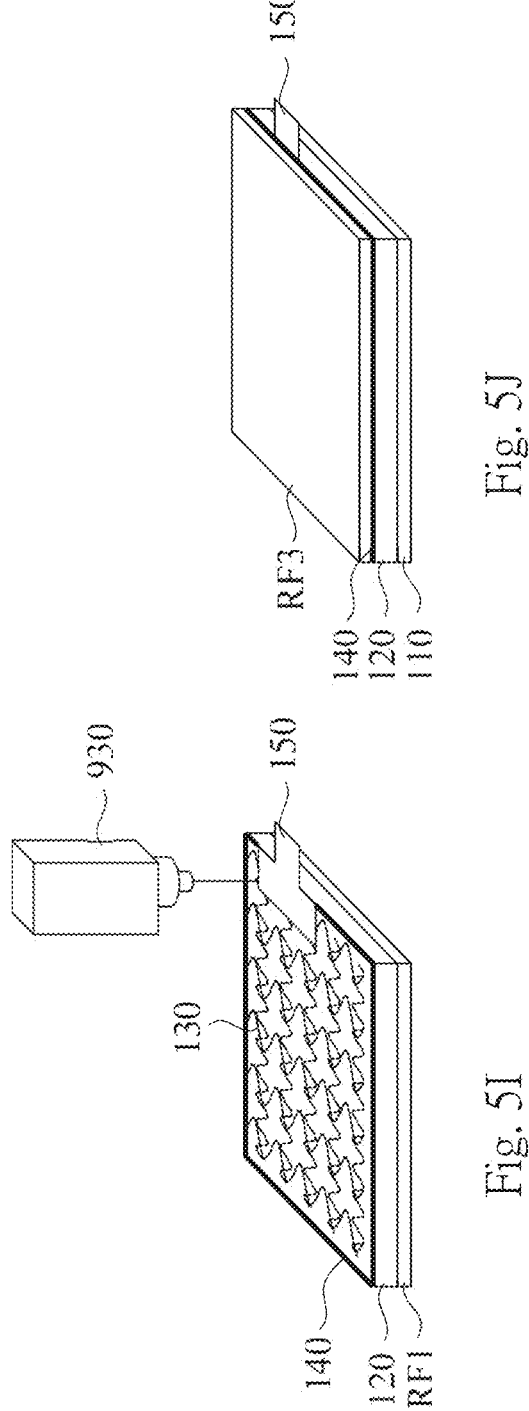

As shown in FIG. 5I, this step follows the step shown in FIG. 5H. In this step, the circuit board 150 is welded to the curved wires 130 (that is, step S230).

Figure 6:
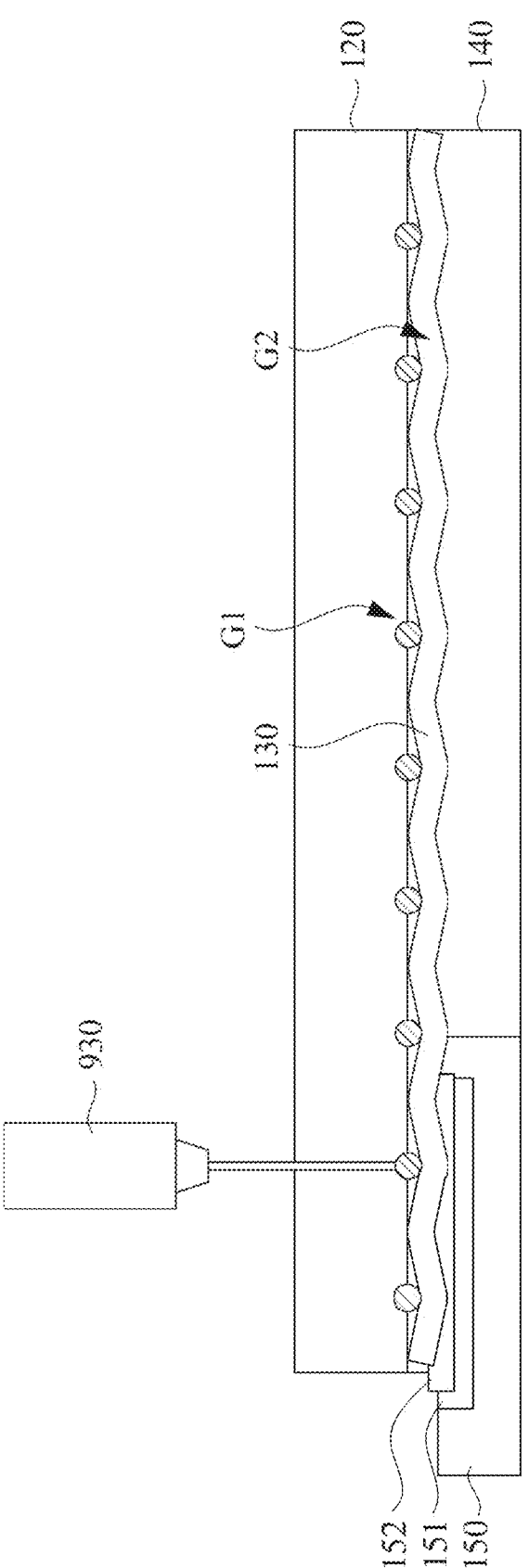
FIG. 6 is a partial cross-section schematic diagram of FIG. 5I.

Please refer to FIG. 6, which is a partial cross-section schematic diagram of FIG. 5I. As shown in FIG. 6, the circuit board 150 is welded to the curved wires 130 using a welding machine 930. The circuit board 150 has a bonding pad 151 disposed thereon. The bonding pad 151 has a metal layer 152 disposed thereon. For example, a material of the metal layer 152 comprises tin. However, the present disclosure is not limited thereto. For example, the welding machine 930 is a laser welding machine. A laser of the laser welding machine can penetrate the first adhesive layer 120 and the second adhesive layer 140 and hit the curved wires 130 that are in contact with the metal layer 152. In several embodiments, the melting point of the covering layer 132 of the curved wire 130 is lower than the melting point of the metal layer 152. Therefore, the high temperature created by laser causes the covering layer 132 to vaporize so that the conductive inner core 131 of the curved wire 130 is exposed. Then, the metal layer 152 is melted and welded to the conductive inner core 131.

As shown in FIG. 5J, this step follows the step shown in FIG. 5I. In this step, the assembly of the first adhesive layer 120, the curved wires 130, the second adhesive layer 140, and the circuit board 150 is placed over the protective cover plate 110 (that is, Step S240). In the embodiment shown in FIG. 5J, the aforementioned assembly is peeled off the separation film RF1 and then placed over the protective cover plate 110 having the first adhesive layer 120 attached thereto. In addition, in this step, the separation film RF3 is attached to the second adhesive layer 140 to protect the second adhesive layer 140.

Please refer to FIG. 7A to FIG. 7H, which are schematic diagrams of, respectively, intermediate steps of the manufacturing method of the touch assembly of an embodiment of the present disclosure. This embodiment is one specific embodiment of the manufacturing method illustrated in FIG. 4 and descriptions are provided as follows.

Figures 7A, 7B, 7C, 7D:
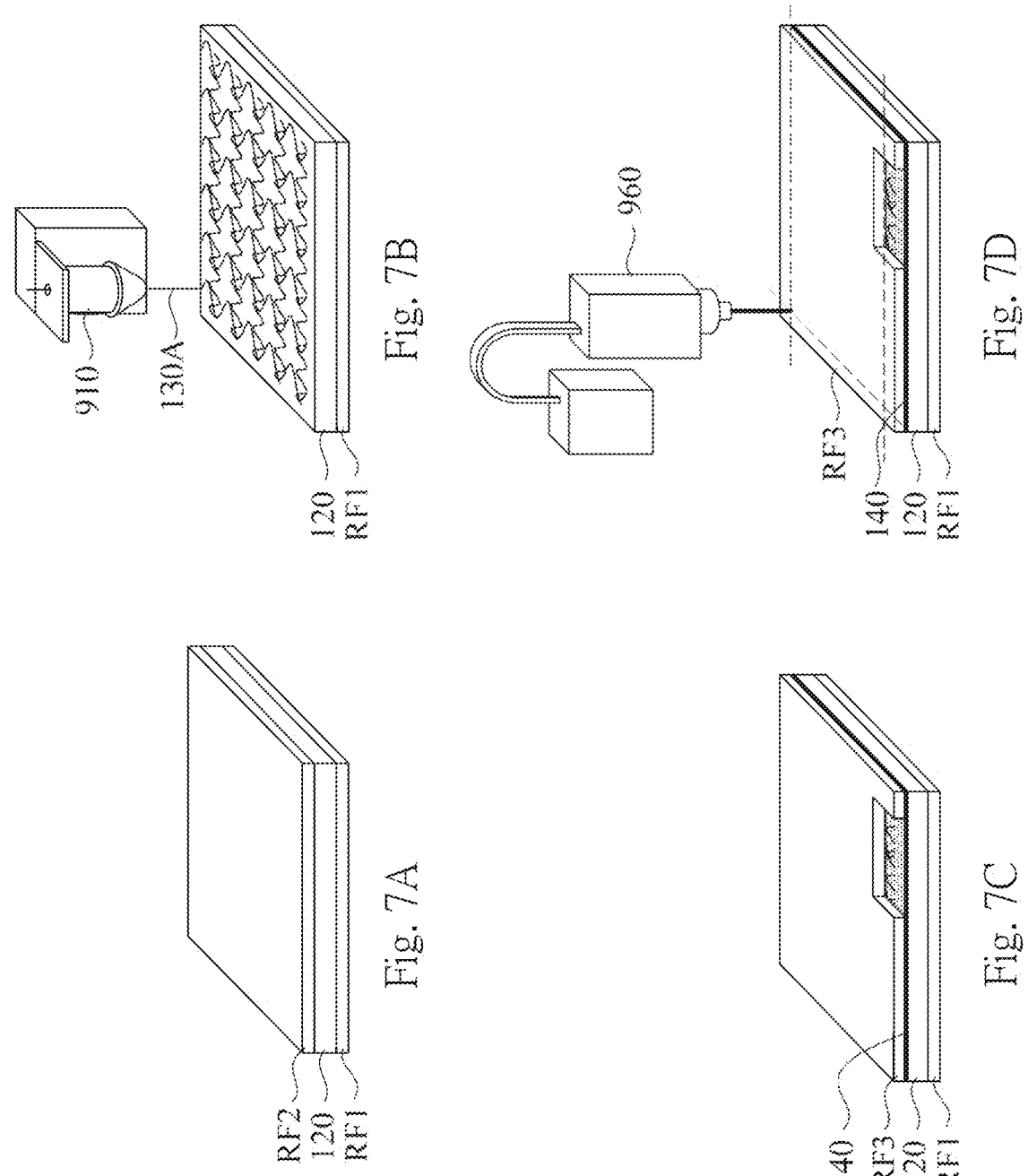

In this step, as shown in FIG. 7A, both the surfaces of the first adhesive layer 120 opposite to each other are laminated with the separation films RF1, RF2 respectively.

As shown in FIG. 7B, this step follows the step shown in FIG. 7A. In this step, the separation film RF2 is peeled off and then the enameled wire 130A is wound on the first adhesive layer 120. The winding method is, for example, to wind the wire back and forth and around along a route on the first adhesive layer 120. Specifically, as shown in FIG. 7B, the enameled wire 130A is disposed on the first adhesive layer 120 in a checkerboard pattern.

As shown in FIG. 7C, this step follows the step shown in FIG. 7B. In this step, the second adhesive layer 140 having a separation film RF3 is adhered to the first adhesive layer 120. More specifically, the second adhesive layer 140 is adhered to the first adhesive layer 120 on the side away from the separation film RF3 to cover the first adhesive layer 120 and the enameled wire 130A. In other words, the assembly of the first adhesive layer 120, the enameled wire 130A, and the second adhesive layer 140 is stacked between the separation film RF1 and the separation film RF3. In comparison with the second adhesive layer 140 shown in FIG. 5H that is formed by hardening the hydrogel 140A, the second adhesive layer 140 in this step is formed by a sheet of gel.

As shown in FIG. 7D, this step follows the step shown in FIG. 7C. In this step, the enameled wire 130A is cut to form a plurality of curved wires 130 using a slitter 960. For example, the slitter 960 is a laser slitter. When the enameled wire 130A is cut by a laser to form curved wires 130 (that is, loop cutting), the first adhesive layer 120, the second adhesive layer 140, and the separation films RF1 and RF3 are cut by the laser at the same time (that is, shape cutting). In comparison with a method of cutting the enameled wire 130A using cutlery, this step will not have the problem of pulling gel at the edge of the cutting area of the separation films RF1 and RF3. Therefore, step S210 and step S220 can be carried out simultaneously by executing steps illustrated in FIG. 7B, FIG. 7C, and FIG. 7D in sequence.

In several embodiments, the laser used in the slitter 960 is a picosecond laser, femtosecond laser, $CO_2$ laser, or similar light source. However, the present disclosure is not limited thereto.

As shown in FIG. 7E, this step follows the step shown in FIG. 7D. In this step, the circuit board 150 and the release film RF3 expose a region of the second adhesive layer 140 for alignment, allowing the circuit board 150 to come into contact with the second adhesive layer 140.

As shown in FIG. 7F, this step follows the step shown in FIG. 7E. In this step, the circuit board 150 is welded to the curved wires 130 by the welding machine 930. Relevant explanations of the welding process can be found in FIG. 6 and the aforementioned description and will not be repeated again. Therefore, Step S210 and Step S230 can be carried out by executing steps illustrated in FIG. 7E and FIG. 7F in sequence.

As shown in FIG. 7G, this step follows the step shown in FIG. 7F. In this step, the circuit board 150 can be sprayed with protection paint after welding. Protection paint is, for example, three anti-glues. However, the present disclosure is not limited thereto. In several embodiments, the step in FIG. 5I is followed by this step.

As shown in FIG. 7H, this step follows the step shown in FIG. 7G. In this step, the assembly of the first adhesive layer 120, the curved wires 130, the second adhesive layer 140, and the circuit board 150 is placed over the protective cover plate 110 (that is, step S240). In the embodiment shown in FIG. 7H, the aforementioned assembly is peeled off the separation film RF1 and then placed over the protective cover plate 110 having the first adhesive layer 120 attached thereto. The separation film RF3 is attached to the second adhesive layer 140 to protect the second adhesive layer 140.

According to the aforementioned descriptions of specific embodiments of the present disclosure, it is apparently that, in the touch assembly of the present disclosure, every curved wire comprises a conductive inner core and a covering layer. Therefore, curved wires can be produced by the winding technology in the touch assembly so that the problems of high pollution and high energy consumption that occur during the complex production process of the prior art that uses indium tin oxide (ITO) as transparent electrodes can be prevented. By limiting the thickness of the first adhesive layer and the initial tack thereof within a specific range, the problem of jump wire that occurs between the curved wires and the corresponding first adhesive layer during the winding process can be effectively prevented. In the manufacturing method of touch assemblies of the present disclosure, by placing the assembly of the first adhesive layer, the curved wires, and the second adhesive layer on the protective cover plate after the step of laminating the second adhesive layer, the problem of damaging the black matrix layer on the protective cover plate caused by the high temperature during the laminating process can be effectively prevented. Furthermore, the gaps among the curved wires can be filled by the first adhesive layer and the second adhesive layer through the method of laminating curved wires between the first adhesive layer and the second adhesive layer. As a result, the visual sense of seeing the curved wires from one side of the second adhesive layer is reduced effectively (that is, reducing the generation of shadows).

The above preferred embodiments are presented to disclose the present disclosure and shall not be interpreted to limit the scope, applicability, or configuration, of the present disclosure in any way. Those skilled in the art may use any alternative embodiments that are modified or changed without departing from the spirit and scope of the present disclosure and shall be included in the appended claims.

COMPONENT SYMBOL

100: touch assembly
110: protective cover plate
120: first adhesive layer
130: curved wire
130A: enameled wire
131: conductive inner core
132: covering layer
140: second adhesive layer
140A: hydrogel
150: circuit board
151: bonding pad
152: metal layer
910: winding machine
920: glue spreader
930: welding machine

940: plate
950: roller
960: slitter
EW: pre-embedded wire
G1: first group of wires
G2: second group of wires
RF1, RF2, RF3: separation film
S110, S120, S130, S140, S210, S220, S230, S240: step
What is claimed is:

1. A touch assembly, comprising:
a protective cover plate;
a first adhesive layer, disposed on the protective cover plate, wherein a thickness of the first adhesive layer is from 20 μm to 200 μm and an initial tack of the first adhesive layer is from 1800 gf/in to 4000 gf/in;
a plurality of curved wires, disposed on the first adhesive layer and comprising a first group of wires and a second group of wires, wherein the first group of wires extends along a first direction, the second group of wires extends along a second direction and is spliced with the first group of wires, and each of the plurality of curved wires comprises a conductive inner core and a covering layer; and
a second adhesive layer, covering the plurality of curved wires and the first adhesive layer.

2. The touch assembly of claim 1, wherein each of the plurality of curved wires is an enameled wire.

3. The touch assembly of claim 1, wherein a material of the covering layer is selected from a group consisting of polyvinyl formal, polyurethane, polyamide, polyester, poly-ester-polyimide, polyamide-polyimide, polyimide, and a combination thereof.

4. The touch assembly of claim 1, wherein a wire diameter of the conductive inner core is from 2 μm to 5 μm.

5. The touch assembly of claim 1, wherein a thickness of the covering layer is from 1 μm to 3 μm.

6. The touch assembly of claim 1, wherein a thickness of the second adhesive layer is from 25 μm to 150 μm.

7. The touch assembly of claim 1, wherein the first adhesive layer and the second adhesive layer fill gaps within the first group of wires and gaps within the second group of wires.

8. A manufacturing method of a touch assembly, comprising:
disposing a plurality of curved wires on a first adhesive layer, wherein the plurality of curved wire comprise a first group of wires and a second group of wires, the first group of wires extends along a first direction, the second group of wires extends along a second direction and is spliced with the first group of wires, each of the plurality of curved wires comprises a conductive inner core and a covering layer, and a thickness of the first adhesive layer is from 20 μm to 200 μm and an initial tack of the first adhesive layer is from 1800 gf/in to 4000 gf/in;
putting a second adhesive layer over the plurality of curved wires and the first adhesive layer such that the second adhesive layer covers the plurality of curved wires and the first adhesive layer; and
laminating the first adhesive layer on a protective cover plate such that the first adhesive layer is disposed on the protective cover plate.

9. The manufacturing method of the touch assembly of claim 8, wherein laminating the first adhesive layer on the protective cover plate comprises: placing an assembly of the first adhesive layer, the plurality of curved wires, and the second adhesive layer over the protective cover plate.

10. The manufacturing method of the touch assembly of claim 9, wherein disposing the plurality of curved wires on the first adhesive layer comprises:
winding enameled wire on to the first adhesive layer; and
cutting the enameled wire to form the plurality of curved wires.

11. The manufacturing method of the touch assembly of claim 10, wherein disposing the plurality of curved wires on the first adhesive layer further comprises:
disposing pre-embedded wire on the first adhesive layer before winding the enameled wire on to the first adhesive layer, wherein winding the enameled wire on to the first adhesive layer is configured to let the enameled wire partially cover over the pre-embedded wire;
wherein cutting the enameled wire to form the plurality of curved wires comprises:
peeling the pre-embedded wire from the first adhesive layer, causing the enameled wire to break and form the plurality of curved wires.

12. The manufacturing method of the touch assembly of claim 11, wherein a wire diameter of the pre-embedded wire is larger than a wire diameter of the enameled wire.

13. The manufacturing method of the touch assembly of claim 11, wherein putting the second adhesive layer over the plurality of curved wires and the first adhesive layer comprises:
coating hydrogel on the first adhesive layer to cover the plurality of curved wires; and
hardening the hydrogel to form the second adhesive layer.

14. The manufacturing method of the touch assembly of claim 13, wherein putting the second adhesive layer over the plurality of curved wires and the first adhesive layer further comprises:
placing a plate over the hydrogel; and
rolling a roller over the plate.

15. The manufacturing method of the touch assembly of claim 10, wherein cutting the enameled wire to form the plurality of curved wires is carried out through a laser cutting process.

16. The manufacturing method of the touch assembly of claim 15, further comprising:
putting the second adhesive layer over the enameled wire and the first adhesive layer before cutting the enameled wire to form the plurality of curved wires, wherein cutting the enameled wire to form the plurality of curved wires also simultaneously cuts the second adhesive layer.

17. The manufacturing method of the touch assembly of claim 8, wherein laminating the first adhesive layer on the protective cover plate is performed before disposing the plurality of curved wires on the first adhesive layer.

18. The manufacturing method of the touch assembly of claim 8, wherein putting the second adhesive layer over the plurality of curved wires and the first adhesive layer is to let the first adhesive layer and the second adhesive layer fill gaps within the first group of wires and gaps within the second group of wires.

19. The manufacturing method of the touch assembly of claim 8, further comprising: welding circuit board to the plurality of curved wires.

* * * * *